United States Patent [19]

Murakami et al.

[11] Patent Number: 5,180,532
[45] Date of Patent: Jan. 19, 1993

[54] PROCESS FOR PREPARING MICA-CONTAINING CERAMIC COMPOSITE

[75] Inventors: Tadaki Murakami; Takashi Shirazawa; Kazuharu Kato, all of Amagasaki, Japan

[73] Assignee: Mitsubishi Denki Kabushiki Kaisha, Tokyo, Japan

[21] Appl. No.: 461,911

[22] Filed: Jan. 8, 1990

[30] Foreign Application Priority Data

Feb. 27, 1989 [JP] Japan .................... 1-47525

[51] Int. Cl.$^5$ .................. C04B 35/71; B28D 1/32
[52] U.S. Cl. ...................... 264/60; 264/66; 264/110; 264/125
[58] Field of Search .............. 264/56, 63, 60, 110, 264/125, 66; 501/103, 133

[56] References Cited

FOREIGN PATENT DOCUMENTS 62-246859 10/1987 Japan .

OTHER PUBLICATIONS

Weber et al. *Advanced Ceramic Materials* vol. 2, No. 3B (1987).
*Industrial Ceramics* (Faenza Italy), p. 46, Mar. 1987.
*Materials Handbook* Brady et al., (1986).
Manufacturing Engineering, Mar. 1976, pp. 26-28, R. N Stauffer, "Now: A Glass-Ceramic That's Machinable".
Nikkei New Materials, Feb. 24, 1986, pp. 40-49, T. Sugano, "Competitable Free Cutting Ceramics".
Mitsubishi Electric Advance, Jun. 1989, pp. 25-28, T. Murakami, et al., "Mio Ceram, a Machinable Ceramic".

*Primary Examiner*—James Lowe
*Assistant Examiner*—Christopher A. Fiorilla
*Attorney, Agent, or Firm*—Oblon, Spivak, McClelland, Maier & Neustadt

[57] ABSTRACT

Mica-containing ceramic composite having excellent characteristics such as capability of machining work, a small thermal expansion coefficient, high heat-shock resistant temperature difference as well as high heat deformation temperature, is prepared by: a) preparing powder mixture by blending 20 to 50% by weight of mica powder, 15 to 40% by weight of zinc oxide powder, 10 to 20% by weight of silica powder, 8 to 20% by weight of boric acid powder, and 4 to 20% by weight of cordierite powder; b) heating the powder mixture at a temperature of from 940° C. to 1,050° C. to prepare baked product; c) pulverizing the baked product into very fine powder to thereby obtain a shaping material; d) adding an organic binder to the shaping material to prepare a shaping composition; and e) shaping the shaping composition into a shaped body and heating a shaped body at a temperature ranging from 940° C. to 1,050° C. with simultaneous application of pressure to the shaped body to render the same into a baked body.

11 Claims, No Drawings

PROCESS FOR PREPARING MICA-CONTAINING CERAMIC COMPOSITE

BACKGROUND OF THE INVENTION

1. Field of the Invention

This invention relates to a process for preparation of mica-containing ceramic composite having low thermal expansion property, high heat-resistance, high mechanical strength, excellent electric insulation, and being capable of machining work, hence being useful as heat-resistant and insulating support members for vehicles and rolling stocks, arc-extinguishing members, heat-insulating members, etc., and other structural members for apparatuses and appliances in the fields of electric machinery, electronic machinery, industrial machinery, and so forth.

2. Discussion of Background

As a process for preparing a mica-containing ceramic composite which is similar to the process of the present invention and capable of being machined, there has so far been known one, as taught in Japanese Patent Publication No. 9614/1968, in which a mica-glass series material is produced by charging a mixture of mica powder and glass powder into a metal mold, and heating the mixture material to a temperature, at which the glass powder becomes molten, while simultaneously pressing the mixed material. This mica-glass series material is excellent in its electric insulation and dimensional stability, and capable of being processed into articles of various configurations owing to its good machinability, hence it has so far been used, in particular, as a heat-resistant electric insulators.

However, since this material has a large thermal expansion coefficient, it is apt to readily bring about cracks, etc., under the conditions such as abrupt heating and cooling, while it is being used. In particular, there tends to readily take place such an occasion, in which the mechanical strength of the material decreases to make it difficult to use the same any longer.

Further, when mica and borosilicate lead glass are made the constituent components (vide: "Glass Handbook" compiled by Sakuhana et al., published from Asakura Shoten (1982)), the thermal expansion coefficient of the material is as large as $10 \times 10^{-6}$ to $12 \times 10^{-6}/°C.$, and its heat-shock temperature difference ($\Delta T$) is also as low as 180° C. or so. Moreover, since borosilicate glass is a kind of low melting point glass, when it is used as a matrix, its heat deformation temperature (the minimum temperature, at which the material brings about blister), is mostly 500° C. or so. Accordingly, the conditions for its use are limited.

The present inventors have already found out the process for preparing the mica-containing ceramic composite material having a low expansion property, for which they have filed a patent application (Japanese Unexamined Patent Publication No. 50365/1988).

SUMMARY OF THE INVENTION

The present invention has been made with a view to establishing a process for preparing the mica-containing ceramic composite having various excellent characteristics, and aims at providing an improved process for preparing the mica-containing ceramic composite which is capable of being machined, has a small thermal expansion coefficient, has high heat-shock temperature difference as well as heat deformation temperature, and can be used under wide varieties of conditions.

According to the present invention, in general aspect of it, there is provided a process for preparing mica-containing ceramic composite, which comprises steps of:

a) preparing a powder mixture by blending materials consisting of 20 to 50% by weight of mica powder, 15 to 40% by weight of zinc oxide powder, 10 to 20% by weight of silica powder, 8 to 20% by weight of boric acid powder, and 4 to 20% by weight of cordierite powder;

b) heating the powder mixture at a temperature of from 940° C. to 1,050° C. to prepare a baked product;

c) pulverizing the baked product into very fine powder to thereby obtain a shaping material;

d) adding an organic binder to the shaping material to prepare a shaping composition; and e) heating a shaped body made of the shaping composition at a temperature ranging from 940° C. to 1,050° C. with simultaneous application of pressure to the shaped body to render the same into a baked shaped body.

The foregoing object, other objects as well as the specific conditions for preparing the mica-containing ceramic composite according to the present invention will become more apparent and understandable from the following detailed description thereof, when read in conjunction with preferred examples to put the present invention into practice.

DETAILED DESCRIPTION OF PREFERRED EMBODIMENTS

In the process for preparing the mica-containing ceramic composite according to the present invention, use is made of, as the constituent materials, mica powder, zinc oxide powder, silica powder, boric acid powder, and cordierite powder.

Mica is a material having excellent heat-resistant property and electric insulation, and, in addition, when it is contained in the ceramic composite, a machinability (or machining property) is imparted to the composite product. As the mica powder to be used for the purpose of the present invention, there may preferably be used synthetic fluorine-phlogopite having a high decomposition temperature, for the reason that the processing temperature in the course of its preparation reaches a level as high as 940° C. to 1,050° C. An average particle size of the mica powder should preferably be 10 $\mu$m or below. When the average particle size exceeds 10 $\mu$m, the baked body tends to be non-uniform in its constituent, which is liable to readily cause chips, cracks, and other defects during the machining work to thereby bring about decrease in the machining precision.

A mixing ratio of the mica powder in the constituent material ranges from 20 to 50% by weight, or more preferably from 25 to 48% by weight. When the mixing ratio is below 20%, the machinability of the baked body is lowered; on the contrary, when it exceeds 50%, the other properties of the baked body, for example, its thermal expansion coefficient becomes increased, even though it still retains the machinability, with the consequence that its heat-shock resistance becomes lowered. In addition, the baked body tends to be porous with the result that its mechanical strength, electrical insulation, and other properties become lowered.

As the other constituent materials than the mica powder, there are used zinc oxide powder, silica powder, boric acid powder, and cordierite powder. These powder materials should preferably have an average particle size of 10 μm or below. When the average particle size exceeds 10 μm, it is difficult to obtain a compact baked body. Moreover, if and when the particle size is large, reaction among the powder materials does not proceed smoothly in the steps of obtaining a baked product, hence the resulting baked body at the final process step is apt to be porous in its structure.

As the above-mentioned zinc oxide powder, there may be used powder material having an average particle size of 0.8 μm and being available in the general market, as it is. Besides this, there may, of course, be used those compounds such as zinc hydroxide, zinc carbonate, and so on, which are turned into zinc oxide by heating.

A blending ratio of zinc oxide powder in the constituent materials ranges from 15 to 40% by weight, or more preferably from 18 to 35% by weight. A ratio not reaching 15% is not preferable, because, in that case, there will be produced less amount of willemite crystals having low thermal expansion property. On the contrary, when the ratio exceeds 40%, it becomes difficult to obtain a compact baked body.

As the silica powder, there may be used quartz powder to be used as the material for producing glass, molten silica powder, and others. In this case, it is preferable to use commercially available powder material, after it is further pulverized to an average particle diameter of 10 μm or below by means of a vibrating mill.

A blending ratio of the silica powder in the constituent materials ranges from 10 to 20 % by weight, or more preferably, it is from 12 to 18% by weight. A ratio not reaching 10% is not preferable, because, in that case, there will be produced less amount of willemite crystals having low thermal expansion property to make it difficult to decrease the thermal expansion coefficient of the baked body. On the contrary, when the ratio exceeds 20%, the heat-resisting temperature of the baked body decreases, and its mechanical strength becomes also inferior.

As the above-mentioned boric acid powder, orthoboric acid may preferably be used. In this case, it is advisable to use the boric acid powder obtained by pulverizing commercially available material by means of a ball mill, vibrating mill, etc. to an average particle diameter of 10 μm or below.

A blending ratio of the boric acid powder in the constituent materials ranges from 8 to 20% by weight, or more preferably, it is from 10 to 18% by weight. When the ratio does not reach 8%, it is difficult to obtain a compact baked body with the consequence that the product is inferior in its mechanical strength, electrical insulation, and various other properties. On the contrary, when the ratio exceeds 20%, a liquid phase increases during the heating of the material to make it difficult to produce a baked body, and the heat-resistance of the resulting baked body becomes also inferior.

The above-mentioned cordierite powder to be used may be obtained from commercially available one which is pulverized to an average particle diameter of 10 μm or below by means of a vibrating mill.

A blending ratio of the cordierite powder in the constituent materials ranges from 4 to 20% by weight, or more preferably, it is from 5 to 18% by weight. When the ratio does not reach 4%, the effect of adding cordierite, which is to render the baked body to be compact in its constituent and to increase its water-resistant property can not be obtained sufficiently. On the contrary, when the ratio exceeds 20%, it becomes difficult to obtain a compact baked body.

In the process of preparing the mica-containing ceramic composite according to the present invention, the above-mentioned materials are uniformly mixed in a ball mill, etc. to obtain thereby mixed powder material. Subsequently, with a view to producing new compounds such as willemite crystals by heating this mixture of materials, it is placed in a refractory vessel such as ceramic crucible, and heated. The heating temperature ranges from 940° C. to 1,050° C., or more preferably it is from 960° C. to 1,030° C. When the heating temperature is below 940° C., the reaction among the materials is not sufficient and the resulting baked body at the final process step is porous. On the contrary, when the heating temperature exceeds 1,050° C., the liquid phase increases and the reaction between mica and other materials becomes active with the consequence that the machinability of the baked body to be obtained at the final process step becomes unfavorably inferior. The heating time, though it depends on the charging quantity of the mixed powder materials, is usually from three to five hours. With the heating time not reaching three hours, there is an apprehension of unreacted portion remaining in the mixed materials. On the contrary, when the reaction time exceeds five hours, there can be seen not so remarkable an effect of extending the time; rather there is an apprehension of mica proceeding to its decomposition.

The thus obtained baked product has a shrinked volume, and takes a massive form in the vessel. In this heating step, the materials are reacted one after another to produce new compounds such as, for example, crystallized substances such as $2ZnO \cdot SiO_2$, $3ZnO.B_2O_3$, $MgO.Al_2O_3$, and others, and a small amount of liquid phase, all of which surround mica.

As mentioned in the foregoing, since the baked product is in the form of a mass, it should be pulverized into fine powder for the purpose of preparing the shaping material. The pulverization should preferably be done in the first place by coarsely crushing the baked product by means of a roll crusher, etc., and then comminuted into fine powder of an average particle size of 10 μm or below by means of a ball mill, a vibrating mill, etc..

In the next place, an organic binder is added to the thus obtained shaping material to thereby prepare a shaping composition. As the organic binder for this purpose, there may be used, for example, aqueous solution of polyvinyl alcohol (having a concentration of from 2 to 5% or so), or other commercially available organic binders. Adding quantity of the organic binder should preferably be in a range of from 2 to 5 parts by weight, in terms of a solid content, with respect to 100 parts by weight of the shaping composition. A mixture of the shaping material and the organic binder should preferably be rendered into granules in a spherical shape having a particle size of from 50 to 100 μm or so by means of a spray drier, or other implements for the purpose of obtaining a shaped body having a uniform density.

With the thus obtained shaping composition in the granular form, the shaped body in a desired configuration is made, after which the shaped body is subjected to simultaneous heating and pressing, thereby producing a baked body.

The production of the shaped body is done by a known method such as, for example, the dry-type press method, in which the shaping composition is pressed at a normal temperature. Although depending on the kind of the organic binder used, the pressing force is generally in a range of from 300 to 1,000 kg/cm², and the pressing time should preferably be in a range of from one to three minutes. By thus preparing the shaped body prior to the simultaneous heating and pressing, efficiency in the production work would increase, whereby the baked body having less fluctuation in its various properties can be obtained easily.

The thus obtained shaped body is subjected to heating to a temperature ranging from a normal temperature to 600° C., prior to its usual heating and pressing, thereby degreasing the same. Thereafter, the shaped body is placed in a heating and pressing device (hot press), and subjected to pressing in the state of its being heated. The heating temperature ranges from 940° C. to 1,050° C., or more preferably from 960° C. to 1,030° C. When the heating temperature is below 940° C., a compact baked body is difficult to be obtained. On the contrary, when the heating temperature exceeds 1,050° C., the material increases its fluidity and flows outside the metal mold, or adheres to the inner wall of the metal mold with the consequent difficulty to obtain the baked body. The pressing force should preferably range from 300 to 1,000 kg/cm² as is the case with production of the shaped body. Although it depends upon the heating temperature, when the pressing force is below 300 kg/cm², the compact baked product is difficult to be obtained. On the contrary, when the pressing force exceeds 1,000 kg/cm², no further improvement can be seen in the compactness of the baked product, hence there is no merit of increasing the pressing force. The time period for pressing should preferably range from one to three minutes.

After the simultaneous heating and pressing, the baked body should preferably be cooled down gradually. This gradual cooling may be done, for instance, by first cooling the shaped body gradually down to about 800° C. or so, while reducing the pressing force to a range of from 10 to 30 kg/cm², then, after removing the pressure, the baked body is taken out of the hot press, and finally the baked body is transferred to a heating furnace maintained at a temperature ranging from 600° to 800° C. and left in it to cool gradually under a natural condition to a temperature level of 200° C. or so. Such gradual cooling is favorable from the point of stress relaxation in the baked body.

Thus, according to the present invention, by effecting the simultaneous heating and pressing, the shaped body is rendered to have high density, which would improve its mechanical property such as bending strength, etc., its electrical properties such as volume resistivity, etc., and its machinability.

According to the process of the present invention as has been described in the foregoing, there can be obtained the mica-containing ceramic composite having a low thermal expansion property, excellent heat-resistant property, mechanical strength as well as electrical insulating property, and yet being capable of machining work. Such ceramic composite can be used as the heat-resistant and insulating support members for vehicles and rolling stocks, arc-extinguishing members, heat-insulating members, etc., and other structural members for apparatuses and appliances in the fields of electric machinery, electronic machinery, industrial machinery, and so forth.

In the following, the present invention will be explained in further detail with reference to several preferred examples thereof. It should, however, be noted that the present invention is not limited to these examples alone, but any changes and modifications in the ingredients used and the process conditions, etc. may be made by those persons skilled in the art without departing from the spirit and scope of the invention as recited in the appended claims.

EXAMPLE 1

The following ingredients were weighed and mixed in a ball mill for three hours to prepare mixed powder material: 284.1 g of synthetic mica (a product of Toppy Kogyo K.K., Japan, having an average particle diameter of 8 $\mu$m) as mica; 303.5 g of zinc oxide (a product of Sakai Chemical Industry Co. Ltd., Japan, having an average particle diameter of 0.8 $\mu$m); 182.1 g of silica (a product of Denki Kagaku Kogyo K.K., Japan, having an average particle diameter of 5 $\mu$m); 121.4 g of boric acid (a product of Ishizu Pharmaceutical Co. Ltd., Japan, having an average particle diameter of 7 $\mu$m); and 108.9 g of cordierite (a product of Seto Ceramic Material K.K., Japan, having an average particle diameter of 5 $\mu$m).

Subsequently, this mixed powder material was charged into a vessel of mullite, and heated in a heating furnace at a temperature of 1,000° C. for three hours to obtain a baked product.

This baked product was then subjected to coarse crushing by means of a roll crusher, after which it was pulverized in a vibrating mill for five hours to thereby prepare a shaping material having an average particle size of 8 $\mu$m.

In the next place, 500 g of 5% aqueous solution of polyvinyl alcohol was added to 1,000 g of the shaping material, with further addition of 700 g of water to make it slurry. With use of this slurry, granules of this shaping material in spherical shape having a particle size in a range of from 50 to 100 $\mu$m was produced by means of a spray drier, thereby obtaining a shaping composition.

400 g of the thus obtained shaping composition was charged in a metal mold having 110 mm in diameter and 100 mm in height. This shaping composition was then pressed under a pressing force of 300 kg/cm² at a normal temperature for one minute, thereby forming a shaped body of about 19 mm in thickness and 110 mm in diameter.

Thereafter, this shaped body was heated from a normal temperature up to and including 600° C. to remove the organic binder, and then it was placed in a shaping device under heat and pressure (hot press) to subject it to simultaneous heating at 1,030° C. and pressing under 300 kg/cm², for three minutes. Subsequently, while reducing the pressing force to 20 kg/cm², the shaped body was gradually cooled to 800° C., followed by removing the pressure. Finally, the thus treated shaped body was taken out of the hot press, and then it was immediately placed in a heating furnace kept at a temperature of 600° C. and left to cool gradually under a natural condition to a temperature level of 200° C. or below. Thereafter, it was removed from the heating furnace to thereby obtain a baked body.

This baked product was measured for its mechanical strength (bending strength), electrical insulating property (volume resistivity), thermal expansion coefficient, heat-deformation temperature, heat-shock resistant temperature difference, and machinability. The results are as shown in Table 1 below.

Mechanical Strength

The bending strength of a test specimen cut into a size of 3 mm in thickness, 4 mm in width, and 50 mm in length was measured at a normal temperature by use of a three-point bending test method with a distance between two supporting points being 25 mm.

Electrical Insulation

The volume resistivity of the test specimen was measured in accordance with JIS C-2141 (Test Method for Electrical Insulation of Ceramic Material).

Thermal Expansion Coefficient

An average thermal expansion coefficient, at a temperature level ranging from a normal temperature to 600° C., of a test specimen cut into a size of 5 mm in thickness, 5 mm in width, and 50 mm in length was measured by use of "Kawashima's full automatic thermal expansion meter".

Heat Deformation Temperature

Thermo-mechanical analyses were effected with a test specimen cut into a size of 1 mm in thickness, 5 mm in width, and 5 mm in length by applying a load of 2.5 kg/cm$^2$. A temperature at which the test specimen commenced to bring about shrinkage, was made its heat-deformation temperature.

Heat-Shock Temperature Difference

A test specimen cut into a size of 5 mm in thickness, 50 mm in width, and 50 mm in length was heated in a heating furnace for one hour, immediately followed by placing it into cold water. A value obtained by subtracting the water temperature from the maximum temperature, at which no cracks, deformations, crazing, and so on took place, was made its heat-shock temperature difference.

Machinability

By use of a carbide-tipped drill of 5 mm in diameter (K-10), through-holes were drilled in a test specimen cut into a size of 5 mm in thickness, 50 mm in width, and 50 mm in length, at a constant rate of rotation of 700 rpm and cutting of 10 m/min. Beneath the test specimen, there was placed a Bakelite (a trademark of Union Carbide Corp., U.S.A.) board of 10 mm thick. The carbide-tipped drill was replaced by new one for each and every test specimen. Evaluation of the machinability of the test specimen was made based on the following criteria: "good—no chips, crazes, etc. did occur in the through-holes"; "fair—chips, crazes, etc. were observed in the through-holes"; and "poor—no through-holes could be made, and machining work was forced to stop on the way".

EXAMPLE 2

381.9 g of synthetic mica, 258.9 g of zinc oxide, 155.3 g of silica, 103.6 g of boric acid, and 100.2 g of cordierite were mixed in a ball mill for three hours to prepare mixed powder material. These constituent materials were same as those used in Example 1 above.

In the same manner as in Example 1 above, the baked product, the shaping material, the shaping composition, the shaped body, and the baked body were made, and their properties were measured. The results are as shown in Table 1 below.

EXAMPLE 3

500 g of synthetic mica, 200 g of zinc oxide, 100 g of silica, 160 g of boric acid, and 40 g of cordierite were mixed in a ball mill for three hours to prepare mixed powder material. These constituent materials were same as those used in Example 1 above.

In the same manner as in Example 1 above, the baked product, the shaping material, the shaping composition, the shaped body, and the baked body were made, and their properties were measured. The results are as shown in Table 1 below.

EXAMPLE 4

300 g of synthetic mica, 200 g of zinc oxide, 100 g of silica, 200 g of boric acid, and 200 g of cordierite were mixed in a ball mill for three hours to prepare mixed powder material. These constituent materials were same as those used in Example 1 above.

In the same manner as in Example 1 above, the baked product, the shaping material, the shaping composition, the shaped body, and the baked body were made, and their properties were measured. The results are as shown in Table 1 below.

EXAMPLE 5

200 g of synthetic mica, 400 g of zinc oxide, 200 g of silica, 80 g of boric acid, and 120 g of cordierite were mixed in a ball mill for three hours to prepare mixed powder material. These constituent materials were same as those used in Example 1 above.

In the same manner as in Example 1 above, the baked product, the shaping material, the shaping composition, the shaped body, and the baked body were made, and their properties were measured. The results are as shown in Table 1 below.

EXAMPLE 6

The same mixed powder material as used in Example 4 above was heated for five hours at 940° C. to prepare a baked product. Then, in the same manner as in Example 1 above, the shaping material, the shaped body, and the baked body were made, and their properties were measured. The results are as shown in Table 1 below.

EXAMPLE 7

The same mixed powder material as used in Example 5 above was heated for three hours at 1,050° C. to prepare a baked product. Then, in the same manner as in Example 1 above, the shaping material, the shaped body, and the baked body were made, and their properties were measured. The results are as shown in Table 1 below.

EXAMPLES 8 and 9

In the same manner as in Example 1 above, the mixed powder material, the baked product, the shaping material, the shaping composition, and the shaped body were made. Then, the baked bodies were prepared in the same manner as in Example 1 above, with the exception that the temperature at the time of the simultaneous heating and pressing by the hot press was changed to 940° C. (Example 8) and 1,050° C. (Example 9), respectively, and their properties were evaluated. The thus obtained baked bodies were found to have had the substantially same properties as those of the baked body obtained in Example 1 above.

COMPARATIVE EXAMPLE 1

By excluding the synthetic mica as used in Example 1 above, a mixed powder material consisting of 423.9 g of zinc oxide, 254.4 g of silica, 169.6 g of boric acid, and 152.1 g of cordierite were prepared. Then, in the same manner as in Example 1 above, the baked product, the shaping material, the shaped body, and the baked body were made, and their properties were measured. The results are as shown in Table 1 below.

COMPARATIVE EXAMPLE 2

With use of 50% of synthetic mica as used in the foregoing examples, as the mica material, and 50% of borosilicate lead glass consisting of 70% of PbO, 10% of $SiO_2$, and 20% of $B_2O_3$, as the glass material, mica-glass series material consisting of 50% of mica and 50% of glass was prepared at a heating temperature of 600° C. and under a pressing force of 300 kg/cm². The properties of the thus obtained mica-glass series material were measured in the same manner as in Example 1 above, with the exception that the thermal expansion coefficient was measured for its average at a temperature of from a normal temperature to 300° C. The results are shown in Table 1 below.

TABLE 1

| | Constituent materials and compositional ratio (% by weight) | | | | | | Properties | | | | |
|---|---|---|---|---|---|---|---|---|---|---|---|
| Example No. | Mica | Zinc oxide | Silica | Boric acid | Cordierite | Low melting point glass | Bending strength (kg/cm²) | Volume resistivity ($\Omega \cdot$ cm) | Thermal expansion coefficient ($\times 10^{-6}$/°C.) | Heat deformation temp. (°C.) | Heat-shock resisting temp. difference ($\Delta T$, °C.) | Machinability |
| 1 | 28.41 | 30.35 | 18.21 | 12.14 | 10.89 | — | 965 | $10^{14}$ | 4.3 | 850 | 280 | Fair |
| 2 | 38.19 | 25.89 | 15.53 | 10.36 | 10.02 | — | 870 | $10^{14}$ | 5.2 | 850 | 260 | Good |
| 3 | 50.00 | 20.00 | 10.00 | 16.00 | 4.00 | — | 815 | $10^{12}$ | 5.8 | 800 | 250 | Good |
| 4 | 30.00 | 20.00 | 10.00 | 20.00 | 20.00 | — | 1020 | $10^{14}$ | 4.2 | 800 | 250 | Fair |
| 5 | 20.00 | 40.00 | 20.00 | 8.00 | 12.00 | — | 1150 | $10^{14}$ | 3.8 | 850 | 280 | Fair |
| 6 | 30.00 | 20.00 | 10.00 | 20.00 | 20.00 | — | 1000 | $10^{14}$ | 4.1 | 800 | 250 | Fair |
| 7 | 20.00 | 40.00 | 20.00 | 8.00 | 12.00 | — | 1180 | $10^{14}$ | 3.6 | 850 | 280 | Fair |
| Comparative Example 1 | — | 42.39 | 25.44 | 16.96 | 15.21 | — | 1480 | $10^{14}$ | 2.9 | 850 | 280 | Poor |
| 2 | 50 | — | — | — | — | 50 | 800 | $10^{13}$ | 11.5 | 450 | 180 | Good |

From Table 1, it will be seen that the mica-containing ceramic composite obtained by the process of preparation according to the present invention has a smaller thermal expansion coefficient, a larger heat-shock resistant temperature difference, and a remarkably improved heat deformation temperature to indicate its heat-resistance, than those of the mica-glass series material of the above Comparative Example 2.

Thus the mica-containing ceramic composite to be obtained by the process of the present invention and consisting of mica, zinc oxide, silica, boric acid and cordierite has an excellent bending strength of as high as from 815 to 1,180 kg/cm², and it can well be subjected to machining work, too. In contrast to this, the ceramic composite of the above Comparative Example 1, which does not contain mica, is incapable of being subjected to the machining work.

As the consequence, by the process of preparing the ceramic composite according to the present invention, it is possible to obtain the mica-containing ceramic composite with a smaller thermal expansion coefficient, remarkably improved heat-shock resistant property, and heat-resistant property.

What is claimed is:

1. A process for preparing a mica-containing ceramic composite, which comprises steps of:
    a) preparing a powder mixture by blending materials consisting of 20 to 50% by weight of mica powder, 15 to 40% by weight of zinc oxide powder, 10 to 20% by weight of silica powder, 8 to 20% by weight of boric acid powder, and 4 to 20% by weight of cordierite powder;
    b) heating said powder mixture at a temperature of from 940° C. to 1,050° C. to prepare a baked product;
    c) pulverizing said baked product into very fine powder to thereby obtain a shaping material;
    d) adding an organic binder to said shaping material to prepare a shaping composition; and
    e) shaping said shaping composition into a shaped body and heating said shaped body at a temperature ranging from 940° C. to 1,050° C. with simultaneous application of pressure to said shaped body to render the same into a baked body.

2. A process according to claim 1, wherein average particle size of each of said mica powder, zinc oxide powder, silica powder, boric acid powder, and cordierite powder is 10 $\mu$m or below.

3. A process according to claim 1, wherein said mixed powder material consists of 25 to 48% by weight of mica powder, 18 to 35% by weight of zinc oxide powder, 12 to 18% by weight of silica powder, 10 to 18% by weight of boric acid powder, and 5 to 18% by weight of cordierite powder.

4. A process according to claim 1, wherein said mica powder is synthetic fluorine-phlogopite.

5. A process according to claim 1, wherein an adding quantity of said organic binder ranges from 2 to 5 parts by weight, in terms of its solid content, with respect to 100 parts by weight of said shaping composition.

6. A process according to claim 1, wherein said organic binder is an aqueous solution of polyvinyl alcohol.

7. A process according to claim 1, wherein a mixture of said shaping material and said organic binder, at said step (d), is rendered granular to prepare a shaping composition having a particle size in a range of from 50 to 100 $\mu$m, at said step (d).

8. A process according to claim 1, wherein said shaped body is produced from said shaping composition at a normal temperature and under a pressure of from 300 to 1,000 kg/cm² in a time period of from one to three minutes.

9. A process according to claim 1, wherein, prior to said simultaneous heating and pressing of said shaped body at the step (e), it is heated to a temperature in a range of from a normal temperature to 600° C. for degreasing the same.

10. A process according to claim 1, wherein, at said step (e), production of said baked body is done by heating said shaped body under a pressure of from 300 to 1,000 kg/cm² for a time period of from one to three minutes, while heating the same.

11. A process according to claim 1, wherein, at said step (e), after said simultaneous heating and pressing of said shaped body, said resulting baked body is gradually cooled to 800° C., while reducing the pressing force to a range of from 10 to 30 kg/cm²; subsequently, after removal of the pressure, said baked body is taken out of a hot press; and then it is transferred into a heating furnace maintained at a temperature ranging from 600° to 800° C., and gradually cooled under a natural condition to a level of 200° C.

* * * * *